Patented Aug. 9, 1932

1,871,117

UNITED STATES PATENT OFFICE

ALLAN R. DAY, OF ARDMORE, PENNSYLVANIA

CATALYST FOR VAPOR PHASE OXIDATION OF ORGANIC COMPOUNDS

No Drawing.     Application filed November 10, 1930.  Serial No. 494,800.

The present invention relates to catalysts for the partial oxidation of organic compounds in vapor phase and to the methods for the preparation of the catalysts.

Copper and silver in various forms have been used as catalysts for vapor phase oxidations, but have been found deficient as the process yields for a single passage over the catalysts of the vapors being oxidized have been too low and also for the reason that these catalysts are readily subject to catalytic poisoning.

I have discovered that the addition of a small amount of a rare earth oxide, as a promoter, to a catalytic substance such as copper oxide or metallic silver will increase the process yield and at the same time will prolong the life of the catalyst almost indefinitely. For example, with a properly prepared catalyst a process yield of 80% acetaldehyde is possible for a single passage of a gaseous mixture of air and ethyl alcohol over the catalyst.

Various combinations of the above mentioned substances have been used for the production of catalysts, but the best results were obtained by using a copper oxide or metallic silver catalyst with the addition of a small amount of a rare earth oxide, preferably samarium oxide, as a promoter. The catalytic material is impregnated on pumice. The amount of rare earth oxide added to the catalyst is somewhat flexible, but I have found that the best results have been obtained from catalysts containing from 0.25% to 5% of rare earth oxide and the remaining 99.75% to 95% being copper oxide or metallic silver. Care must be exercised in this respect as the addition of too high a percentage of the rare earth oxide will result in a catalyst the action of which can not be controlled and which will cause a complete oxidation of the gaseous mixture to carbon dioxide and water. I have discovered further that the addition of the rare earth oxide will give a greater porosity to the catalyst than a catalyst of copper oxide or metallic silver alone. This greater porosity, of course, results in a better contact between the catalyst and the gaseous mixture and in a saving of catalytic material.

My invention will be described in greater detail in connection with the following specific description of the methods of preparing the catalysts:

(1) *Copper oxide—rare earth oxide catalyst.*—The pure nitrate of the copper and rare earth in their proper proportions are dissolved in water to which a small amount of nitric acid has been added. To this mixture 12 mesh pumice is added in the proportion of 9 cc. of pumice to every 3 grams of the mixed oxides, the mixture is then slowly evaporated to dryness with constant stirring. The pumice impregnated with the catalytic material is then heated in a stream of air or oxygen at 450° to 600° C. until the decomposition of the copper and rare earth nitrates to oxides is complete. Before using the catalyst it should preferably be heated in a stream of air and alcohol vapor for an hour, which heating serves to form a more uniform layer of the catalyst on the pumice thereby giving it a greater area of active contact surface.

(2) *Metallic silver—rare earth oxide catalyst.*—I have obtained excellent results by dissolving pure nitrates of silver and rare earth in water to which a small amount of nitric acid has been added. To this mixture 12 mesh pumice is added in the proportion of 9 cc. of pumice to every 3 grams of the mixed nitrates. The mixture is then slowly evaporated to dryness with constant stirring, the dryed catalyst is then heated in pure air at 450°–600° to decompose the rare earth nitrate to an oxide and the silver nitrate to metallic silver. Before use, this catalyst should also be heated in a stream of air and alcohol vapor as stated above.

The above catalysts may be used in any vapor phase oxidation apparatus known to the art in which a mixture of the gas to be oxidized and air is passed over the catalyst. With the present catalysts, however, it is not necessary to apply heat constantly to keep the action progressing. I have found that if the catalyst is initially heated to the temperature at which the desired reaction takes place that the heat of the reaction is sufficient to keep the catalyst at the desired temperature so that the reaction will progress without further attention to the catalyst.

The above catalysts have been used for the vapor phase oxidation of the aliphatic monohydric alcohols, up to and including the amyl alcohols. The products were, according to the starting material, aldehydes, ketones and acids. Formaldehyde has been obtained by the oxidation of ethylene. Toluene, when oxidized, yielded benzaldehyde, benzoic acid and traces of other hydrocarbons. Benzene has yielded small amounts of phenol. In general, these catalysts may serve in the vapor phase oxidation of the organic compounds usually subjected to such treatment.

Having thus described my invention, I claim:

1. A catalyst comprising metallic silver with the addition of a small amount of a rare earth oxide.

2. A catalyst comprising a mixture of metallic silver and a small amount of a rare earth oxide impregnated on a carrier substance.

3. A catalyst comprising a mixture of metallic silver and a rare earth oxide impregnated on pumice, the amount of rare earth oxide being not less than 0.25% nor more than 5.0% of the weight of the mixture.

4. A catalyst comprising a mixture of metallic silver and samarium oxide impregnated on a carrier substance.

5. A catalyst comprising a mixture of metallic silver and samarium oxide impregnated on pumice in the proportions of 95% to 99.75% metallic silver and 5% to 0.25% samarium oxide.

6. The process of preparing a catalyst, comprising forming a solution of a metallic nitrate and a rare earth nitrate, adding thereto a carrier substance, evaporating the resulting mixture to dryness, then heating the mixture to a temperature sufficiently high to decompose the nitrates.

7. The process of preparing a catalyst, comprising dissolving a mixture of silver nitrate and a rare earth nitrate in water, adding a carrier substance to the solution, evaporating the solution to dryness and then heating the residue.

8. The process of preparing a catalyst; comprising dissolving a mixture of silver nitrate and a rare earth nitrate in water, the rare earth nitrate being not more than 5% nor less than 0.25% of the weight of the mixture; adding ground pumice stone to the solution; evaporating the solution to dryness and then heating the residue.

9. The process of preparing a catalyst; comprising dissolving a mixture of silver nitrate and a rare earth nitrate in water, the rare earth nitrate being not more than 5% nor less than 0.25% of the weight of the mixture; adding ground pumice stone in the proportion of 9 cc. of pumice stone to every 3 grams of the mixed nitrates; evaporating the solution to dryness and then heating the residue to a temperature of 450° to 600° centigrade.

10. The process of preparing a catalyst; comprising dissolving a mixture of silver nitrate and samarium nitrate in water, adding a carrier substance to the solution, evaporating the solution to dryness and then heating the residue.

11. The process of preparing a catalyst; comprising dissolving a mixture of silver nitrate and samarium nitrate in water, the samarium nitrate being not more than 5% nor less than 0.25% of the weight of the mixture; adding ground pumice stone in the proportion of 9 cc. of pumice stone to every 3 grams of the mixed nitrates; evaporating the solution to dryness and then heating the residue in a stream of oxygen to a temperature of 450° to 600° centigrade.

In testimony whereof I have affixed my signature.

ALLAN R. DAY.